US012620209B2

(12) United States Patent (10) Patent No.: US 12,620,209 B2
Ji et al. (45) Date of Patent: May 5, 2026

(54) METHOD AND SYSTEM FOR GENERATING IMAGE ADVERSARIAL EXAMPLES BASED ON AN ACOUSTIC WAVE

(71) Applicant: ZHEJIANG UNIVERSITY, Hangzhou (CN)

(72) Inventors: Xiaoyu Ji, Hangzhou (CN); Wenyuan Xu, Hangzhou (CN); Yushi Cheng, Hangzhou (CN); Yuepeng Zhang, Hangzhou (CN); Kai Wang, Hangzhou (CN); Chen Yan, Hangzhou (CN)

(73) Assignee: ZHEJIANG UNIVERSITY, Hangzhou (CN)

( * ) Notice: Subject to any disclaimer, the term of this patent is extended or adjusted under 35 U.S.C. 154(b) by 1079 days.

(21) Appl. No.: 17/702,662

(22) Filed: Mar. 23, 2022

(65) Prior Publication Data

US 2022/0215652 A1 Jul. 7, 2022

Related U.S. Application Data

(63) Continuation of application No. PCT/CN2021/124791, filed on Oct. 19, 2021.

(30) Foreign Application Priority Data

Oct. 20, 2020 (CN) .......................... 202011124293.6

(51) Int. Cl.
*G06V 10/776* (2022.01)
*G06N 20/00* (2019.01)
(Continued)

(52) U.S. Cl.
CPC ........... *G06V 10/776* (2022.01); *G06N 20/00* (2019.01); *G06V 10/147* (2022.01);
(Continued)

(58) Field of Classification Search
None
See application file for complete search history.

(56) References Cited

U.S. PATENT DOCUMENTS 11,379,722 B2 * 7/2022 Chang .................. G06V 10/764
2020/0272726 A1 8/2020 Moe et al.
(Continued)

FOREIGN PATENT DOCUMENTS

CN 109471112 A 3/2019
CN 109784424 A 5/2019
(Continued)

OTHER PUBLICATIONS

The first examination report dated May 26, 2021 for Chinese Application No. 202011124293.6.
(Continued)

*Primary Examiner* — Mark R Milia

(57) ABSTRACT

The disclosure discloses a method and a system for generating image adversarial examples based on an acoustic wave. The method includes: acquiring an image containing a target object or a target scene; generating simulated image examples for the acquired image, wherein the simulated image examples have adversarial effects on a deep learning algorithm in a target machine vision system; optimizing the generated simulated image examples to obtain an optimal adversarial example and corresponding adversarial parameters; and injecting the adversarial parameters into an inertial sensor of the target machine vision system in a manner of an acoustic wave, such that the adversarial parameters are used as sensor readings that will cause an image stabilization module in the target machine vision system to operate to generate particular blurry patterns in a generated real-world image so as to generate an image adversarial example in a physical world.

8 Claims, 3 Drawing Sheets

100 acquiring an image containing a target object or a target scene — S101 generating simulated image examples for the acquired image by using an acoustic wave-based adversarial example simulation model, wherein the simulated image examples have adversarial effects on a deep learning algorithm in a target machine vision system — S102 optimizing the generated simulated image examples by using an adversarial example optimization method to obtain optimal adversarial examples and corresponding adversarial parameters — S103 injecting the adversarial parameters into an inertial sensor of the target machine vision system in a manner of an acoustic wave by using an inertial sensor reading injection method, such that the adversarial parameters are used as sensor readings that will cause an image stabilization module in the target machine vision system to operate to generate particular blurry patterns in a generated real-world image so as to generate image adversarial examples in a physical world — S104

(51) Int. Cl.

| | |
|---|---|
| *G06V 10/147* | (2022.01) |
| *G06V 10/764* | (2022.01) |
| *G06V 10/778* | (2022.01) |
| *G06V 10/80* | (2022.01) |
| *G06V 10/82* | (2022.01) |
| *H04N 23/68* | (2023.01) |

(52) U.S. Cl.
CPC ........ *G06V 10/764* (2022.01); *G06V 10/7796* (2022.01); *G06V 10/809* (2022.01); *G06V 10/82* (2022.01); *H04N 23/682* (2023.01)

(56) References Cited

U.S. PATENT DOCUMENTS

| | | |
|---|---|---|
| 2020/0285952 A1 | 9/2020 | Liu et al. |
| 2020/0300883 A1 | 9/2020 | Fu et al. |

FOREIGN PATENT DOCUMENTS

| | | |
|---|---|---|
| CN | 109902709 A | 6/2019 |
| CN | 110210573 A | 9/2019 |
| CN | 110767216 A | 2/2020 |
| CN | 111143873 A | 5/2020 |
| CN | 111488895 A | 8/2020 |
| CN | 112333402 A | 2/2021 |
| DE | 102020103769 A1 | 10/2020 |
| WO | WO2020123084 A1 | 6/2020 |

OTHER PUBLICATIONS

International Search Report dated Jan. 25, 2022 for PCT application No. PCT/CN2021/124791.

Zheng, Shuai et al., "Trace Norm Generative Adversarial Networks for Sensor Generation and Feature Extraction" ICASSP 2020—2020 IEEE International Conference on Acoustics, Speech and Signal Processing (ICASSP), May 14, 2020, pp. 3188-3191.

Jia, Wei-bin et al., "Research on Reliability of Collision Sensor Based on Acoustic Wave Testing," Control Engineering of China, vol. 26, No. 11, Nov. 2019, pp. 1971-1977, DOI: 10.14107/j.cnki.kzgc.170784.

* cited by examiner

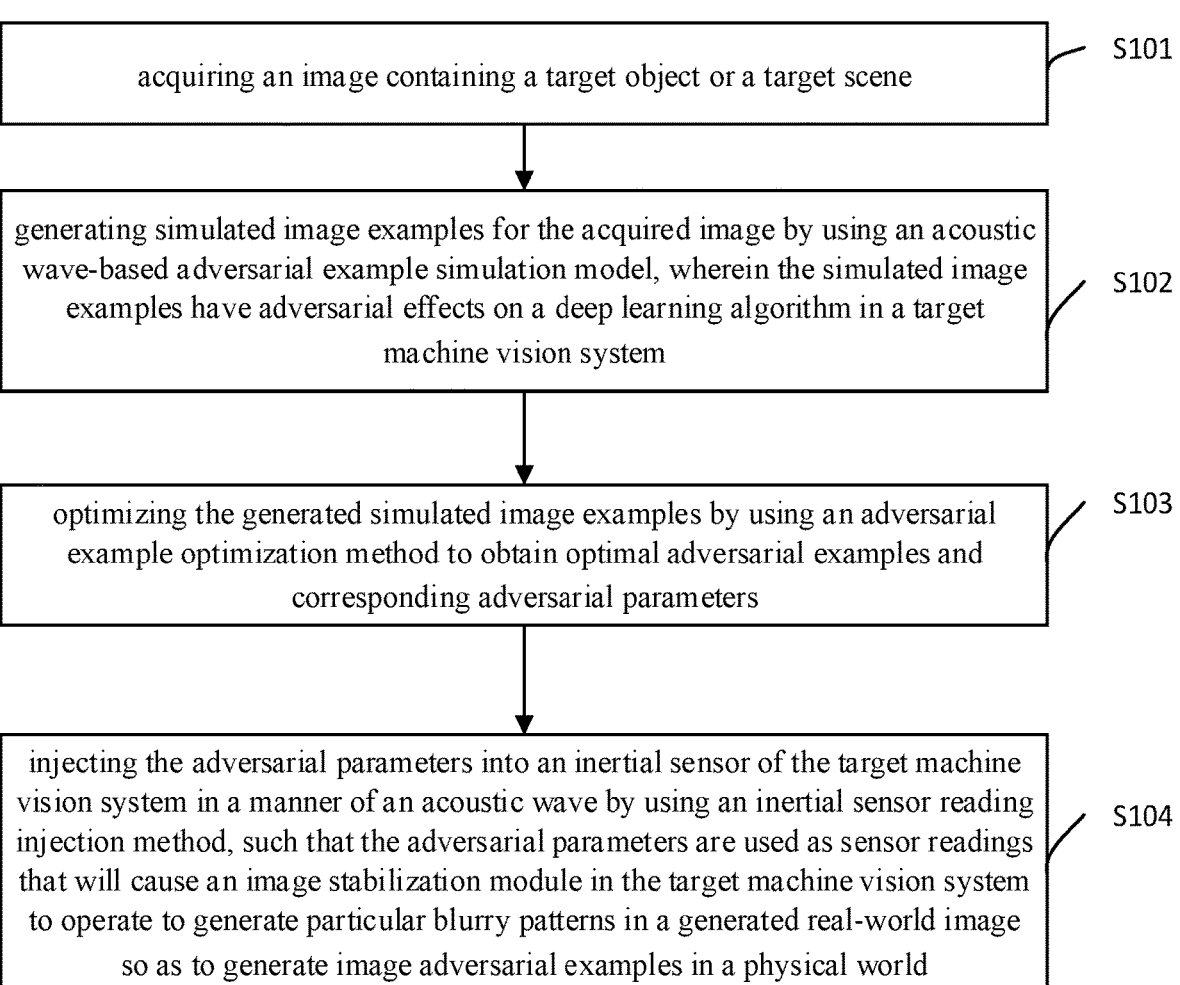

100 acquiring an image containing a target object or a target scene — S101 generating simulated image examples for the acquired image by using an acoustic wave-based adversarial example simulation model, wherein the simulated image examples have adversarial effects on a deep learning algorithm in a target machine vision system — S102 optimizing the generated simulated image examples by using an adversarial example optimization method to obtain optimal adversarial examples and corresponding adversarial parameters — S103 injecting the adversarial parameters into an inertial sensor of the target machine vision system in a manner of an acoustic wave by using an inertial sensor reading injection method, such that the adversarial parameters are used as sensor readings that will cause an image stabilization module in the target machine vision system to operate to generate particular blurry patterns in a generated real-world image so as to generate image adversarial examples in a physical world — S104

| acoustic wave-based adversary simulation module 301 | adversarial example optimization module 302 | sensor reading injection module 303 |

METHOD AND SYSTEM FOR GENERATING IMAGE ADVERSARIAL EXAMPLES BASED ON AN ACOUSTIC WAVE

The present application is a continuation of International Application No. PCT/CN2021/124791, filed on Oct. 19, 2021, which claims a priority to Chinese patent application No. 202011124293.6, filed on Oct. 20, 2020, both of which are incorporated herein by reference in their entireties.

TECHNICAL FIELD

The present application relates to the field of artificial intelligence, and particularly to a method and system for generating image adversarial examples based on an acoustic wave.

BACKGROUND

With continuous development of artificial intelligence technologies, machine vision is widely used in existing intelligent systems, such as an intelligent robot, a self-driving car, etc. Machine vision uses a camera to capture information about surrounding environment of an intelligent system, and uses a deep learning algorithm to detect and recognize an object contained in a captured image, so as to achieve a purpose of perception of the environment. Since results of perception by the machine vision are usually used as an information source for subsequent decision-making of the intelligent system, security of the results of perception by the machine vision is very important.

In recent years, researches on an image adversarial example has been increasing. An image adversarial example refers to an example that can interfere with results of perception by the machine vision. Researches on an image adversarial example has important guiding significance for ensuring security of a machine system or an intelligent system. At present, researches on an image adversarial example mainly focus on a digital domain, that is, a pixel value in a digital image is directly modified to construct an image adversarial example. Although the image adversarial example constructed by this method generally has good adversarial effects, it is difficult to be applied in a practical system. In addition, there is currently a method for constructing an image adversarial example based on a physical domain, but since it requires an appearance of a target object is modified or some light is injected into a camera, it has poor concealment.

SUMMARY

According to a first aspect, there is provided method for generating image adversarial examples based on an acoustic wave. The method includes: acquiring an image containing a target object or a target scene; generating simulated image examples for the acquired image by using an acoustic wave-based adversarial example simulation model, wherein the simulated image examples have adversarial effects on a deep learning algorithm in a target machine vision system; optimizing the generated simulated image examples by using an adversarial example optimization method to obtain optimal adversarial examples and corresponding adversarial parameters; and injecting the adversarial parameters into an inertial sensor of the target machine vision system in a manner of an acoustic wave by using an inertial sensor reading injection method, such that the adversarial parameters are used as sensor readings that will cause an image stabilization module in the target machine vision system to operate to generate particular blurry patterns in a generated real-world image so as to generate image adversarial examples in a physical world.

In some embodiments, the acoustic wave-based adversarial example simulation model is constructed by the following three steps:

(1) false camera motion modeling: it is assumed that false readings of the inertial sensor caused by an acoustic attack is $M_f = \{a_x, a_y, a_z, \omega_r, \omega_p, \omega_y\}$, where $a_x, a_y, a_z$ are false acceleration readings at x, y, z axes of an accelerometer, respectively, $\omega_r, \omega_p, \omega_y$ are false angular velocity readings at roll, pitch, yaw axes of a gyroscope, respectively and it is assumed that the image stabilization module is operable to perform a complete compensation, and false camera motion caused by the acoustic attack is $M_c = \{-a_x, -a_y, -a_z, -\omega_r, -\omega_p, -\omega_y\}$, wherein the acoustic wave-based adversarial example simulation model is constructed by four dimensions including three dimensions of x, y, z axes of the accelerometer and one dimension of roll axis of the gyroscope among the six dimensions;

(2) pixel motion modeling: the false camera motion will cause a different imaging position of the target object or the target scene, resulting in occurrence of pixel motion in an output image; wherein:

with respect to the dimension of x axis of the accelerometer, for any pixel in the image, the false camera motion $-a_x$ causes a pixel displacement of $$\frac{f}{2u}a_x T^2$$

in an opposite direction during an imaging process, where f is a focal length of the camera and u is an object distance of the target object or the target scene, T is a exposure time of the camera;

with respect to the dimension of y axis of the accelerometer, for any pixel in the image, the false camera motion $-a_y$ causes a pixel displacement of $$\frac{f}{2u}a_y T^2$$

in an opposite direction during the imaging process;

with respect to the dimension of z axis of the accelerometer, for any pixel in the image, the false camera motion $-a_z$ causes a pixel displacement of $$\frac{r_o}{2u}a_z T^2$$

in a direction tar away from a center of the image during the imaging process, where $r_o$ is a distance between the pixel and the center of the image;

with respect to the dimension of roll axis of the gyroscope, for any pixel in the image, the false camera motion $-\omega_r$ causes pixel displacement of $\omega_r T r_c$ in an opposite direction during the imaging process, where $r_c$ is a distance between the pixel and a center of angular velocity rotation;

(3) image blur modeling: pixel motion during the imaging process will cause image blur, wherein false camera motion in dimensions of x axis and y axis of the accelerometer causes linear pixel motion, resulting in linear image blur;

false camera in the dimension of z axis of the accelerometer causes radial pixel motion, resulting in radial image blur; and false camera motion in the dimension of roll axis of the gyroscope causes rotary pixel motion, resulting in rotary image blur; wherein a unified image blur model is constructed for the above blurs as follows:

$$B(i, j) = \frac{1}{n+1} \sum_{k=-n}^{0} X(i'(k), j'(k))$$

$$[i'(k), j'(k)]^T = [u(k), v(k)]^T + [i, j]^T$$

$$[u(k), v(k)]^T = \begin{bmatrix} \cos\alpha & \cos\left(\frac{k}{n}\beta + \gamma\right) & \cos\delta \\ \sin\alpha & \sin\left(\frac{k}{n}\beta + \gamma\right) & \sin\delta \end{bmatrix} \begin{bmatrix} \frac{kf|a_x + a_y|T^2}{2nu} \\ \frac{kfa_zT^2 r_o}{2nu} \end{bmatrix}$$

$$\alpha = \arccos\left(\frac{a_x \cdot a_y}{|a_x||a_y|}\right)$$

$$\beta = \omega_\gamma T$$

$$\gamma = \arctan\left(\frac{j - c_1}{i - c_0}\right)$$

$$\delta = \arctan\left(\frac{j - 0_1}{i - 0_0}\right)$$

$$r_c = \|(i, j), (c_0, c_1)\|_2$$

$$r_o = \|(i, j), (0_0, 0_1)\|_2$$

where X is an original image, B is a blurred image, (i,j) is an coordinate of a pixel, B(i,j) is a pixel with an coordinates (i,j) in the blurred image, n is the number of discrete points, $(c_0, c_1)$ is a coordinate of an image center, $(0_0, 0_1)$ is a coordinate of a rotation center; the simulated image examples are obtained under respective adversarial parameters based on the false camera motion modeling, the pixel motion modeling, and the image blur modeling.

In some embodiments, the optimizing the generated simulated image examples by using an adversarial example optimization method to obtain optimal adversarial examples and corresponding adversarial parameters comprises the following steps:

(1) designing optimized functions: different optimized functions are designed for different types of adversarial image examples; wherein three types of adversarial image examples with different effects are taken into consideration: the first type is an adversarial image example with a hiding effect, which makes the depth learning algorithm unable to identify the target object; the second type is an adversarial image example with a creating effect, which creates a target object in the current image that is detectable by the deep learning algorithm; and the third type is an adversarial image example with a changing effect, which enables the deep learning algorithm to detect the target object as another object;

for the adversarial image example with a creating effect, optimization functions are:

$$\min_{a_x, a_y, a_z, \omega_r} -w_3 \frac{S_o^B S_o^c \mid C_o = T}{\sum_{p=1}^m Uop} + w_4 \|B - X\|_p$$

$$\text{s.t. } |a_x + a_y + a_z| < \varepsilon_1$$

$$|\omega_r| < \varepsilon_2$$

where o is the number of a target object to be created, $C_o = T$ is a category of the target object to be created, $$S_o^B$$

is a detection confidence of an area of the target object to be created outputted by the deep learning algorithm, $$S_o^C$$

is a detection confidence of a category of the target object to be created outputted by the deep learning algorithm, p is a number of an existed object in the image, m is the number of the existed objects in the image, Uop is an intersection ratio between the area of the object o to be created and the area of the existed object p, $w_3$ and $w_4$ are weight values for balancing effectiveness of the adversarial image examples and example generation cost, $\varepsilon_1$ and $\varepsilon_2$ are upper limits of influences of an acoustic wave on readings of the accelerometer and the gyroscope respectively;

for the adversarial image example with a changing effect, optimization functions are:

$$\min_{a_x, a_y, a_z, \omega_r} -w_5 Upp' S_p^{B'} S_p^{C'} \mid C_p' = T + w_6 \|B - X\|_p$$

$$\text{s.t. } |a_x + a_y + a_z| < \varepsilon_1$$

$$|\omega_r| < \varepsilon_2$$

where p is a number of the target object, $$S_p^{B'}$$

is a detection confidence of a modified area of the target object outputted by the deep learning algorithm, $$S_p^{C''}$$

is a detection confidence of a modified category of the target object outputted by the deep learning algorithm, $C_p' = T$ is the modified category of the target object, Upp' is an intersection ratio of the area of the target object p before modification and the area of the target object p' after modification, $w_5$ and $w_6$ are weight values for balancing effectiveness of the adversarial image examples and example generation cost, $\varepsilon_1$ and $\varepsilon_2$ are upper limits of influences of an acoustic wave on readings of the accelerometer and the gyroscope respectively;

(2) solving optimized functions: the optimized functions are solved by using a Bayesian optimization method to obtain the optimal adversarial parameters.

In some embodiments, the inertial sensor reading injection method may include: determining a resonance frequency of the inertial sensor in the target machine vision system by a frequency scanning; adjusting a resonance frequency of the acoustic wave to introduce a direct current (DC) component into an analog-to-electrical converter so as to stabilize an output of the sensor; and performing an amplitude modulation to shape a waveform outputted from the sensor such that the sensor readings approximate the adversarial parameters.

With the steps, an optimal adversarial parameter for a target object can be injected into the inertial sensor of the target machine vision system by means of an acoustic wave and is used as sensor readings, which will cause an image stabilization module in the target machine vision system to operate to generate particular blurry patterns in an captured real-world image, and in turn to generate an image adversarial example in a physical world.

According to another aspect of the present application, there is provided a system for generating image adversarial examples based on an acoustic wave. The system includes: an acoustic wave-based adversary simulation module, an adversarial example optimization module, and a sensor reading injection module. The acoustic wave-based adversary simulation module is configured for false camera motion modeling, pixel motion modeling and image blur modeling; the adversarial example optimization module is configured for design of optimized functions and solution of optimized functions; and the sensor reading injection module is configured for resonance frequency determination, false reading stabilization, and false reading shaping; the system utilizes the acoustic wave-based adversary simulation module, the adversarial example optimization module and the sensor reading injection module to implement the method for generating image adversarial examples based on an acoustic wave as described above.

According to another aspect of the present application, there is provided a system for generating image adversarial examples based on an acoustic wave. The system includes: means for acquiring an image containing a target object or a target scene; means for generating simulated image examples for the acquired image by using an acoustic wave-based adversarial example simulation model, wherein the simulated image examples have adversarial effects on a deep learning algorithm in a target machine vision system; means for optimizing the generated simulated image examples by using an adversarial example optimization method to obtain optimal adversarial examples and corresponding adversarial parameters; and means for injecting the adversarial parameters into an inertial sensor of the target machine vision system in a manner of an acoustic wave by using an inertial sensor reading injection method, such that the adversarial parameters are used as sensor readings that will cause an image stabilization module in the target machine vision system to operate to generate particular blurry patterns in a generated real-world image so as to generate an image adversarial example in a physical world.

According to yet another aspect of the present application, there is provided a system for generating image adversarial examples based on an acoustic wave. The system includes: a memory for storing instructions; and a processor that executes the instructions stored in the memory to perform the method for generating image adversarial examples based on an acoustic wave as described above.

According to another aspect of the present application, there is provided a non-transitory computer-readable storage medium. The non-transitory computer-readable storage medium has instructions stored thereon, wherein the instructions, when executed by a processor, cause the processor to execute the method for generating image adversarial examples based on an acoustic wave as described above.

Compared with the existing methods for constructing an adversarial example, the method for generating image adversarial examples based on an acoustic wave provided according to the present invention has better practicability and concealment, thereby providing a novel concept for construction of an image adversarial example and providing a new guidance for safety analysis and protection of machine learning.

BRIEF DESCRIPTION OF THE DRAWINGS

FIG. 1 is a flowchart illustrating a method for generating image adversarial example based on an acoustic wave according to an embodiment of the present application.

DETAILED DESCRIPTION

Figure 2:
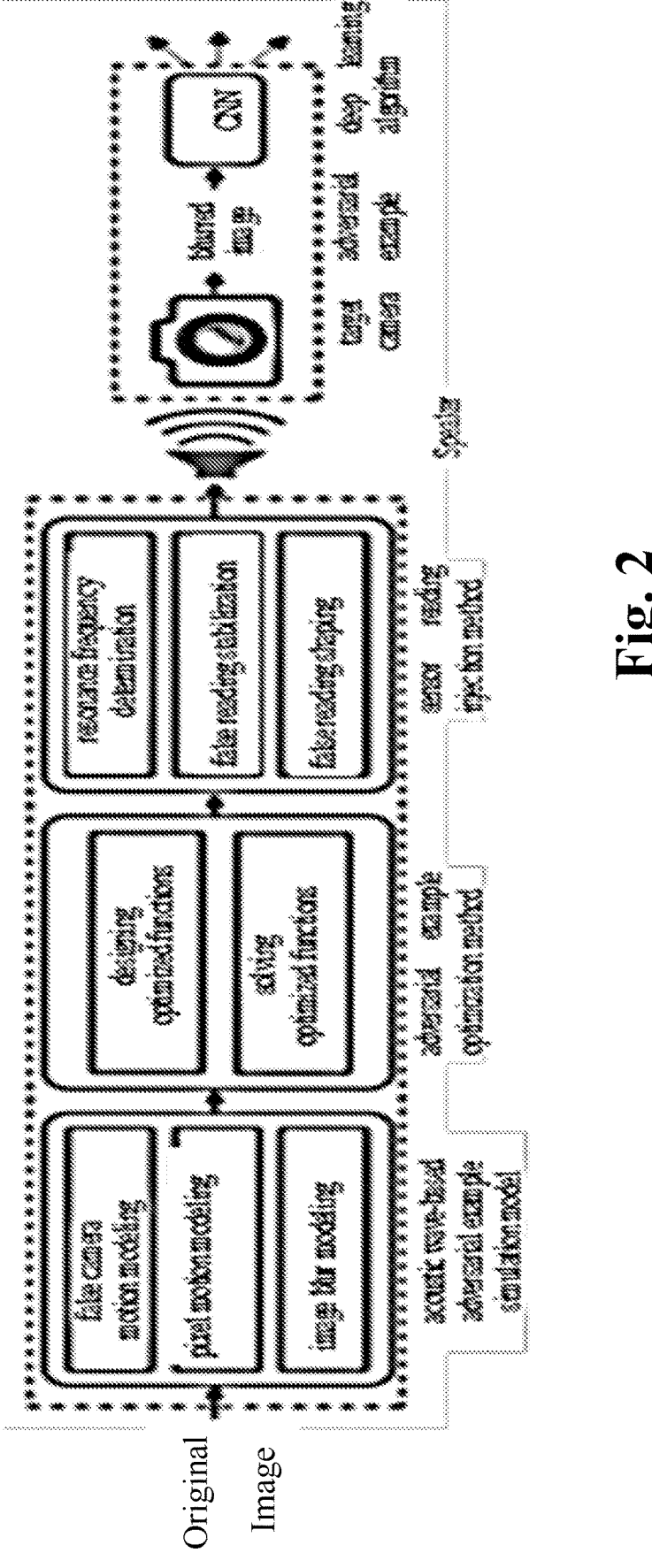
FIG. 2 is a more detailed schematic diagram illustrating for generating image adversarial examples based on an acoustic wave according to an embodiment of the present application.

The present application provides a method and system for generating image adversarial examples based on an acoustic wave. The method uses acoustic waves to affect readings of an inertial sensor of a machine vision system, and thus causes an image stabilization module to implement an erroneous compensation to blur an image, thereby constructing three different types of image adversarial examples.

The method makes full usage of vulnerability of an inertial sensor and a deep learning algorithms in an existing machine vision system, and innovatively proposes to use an acoustic wave to construct an image adversarial example suitable for a physical world, thereby deceiving the machine vision systems. Compared with the existing image adversarial example construction method based on a digital domain, the image adversarial example constructed by the method provided according to embodiments of the present application has stronger applicability in the real physical world; and compared with the existing image adversarial example construction method based on the physical domain, the method provided according to embodiments of the present application does not need to modify an appearance of an object or inject light into the camera, and thus has better concealment.

The present invention will be further described below with reference to the embodiments and the accompanying drawings.

FIG. 1 is a flowchart illustrating a method for generating image adversarial examples based on an acoustic wave according to an embodiment of the present application. As shown in FIG. 1, the method 100 for generating image adversarial examples based on an acoustic wave according to an embodiment of the present application includes the following steps S101-S104.

At S101, an image containing a target object or a target scene is acquired.

At S102, simulated image examples for the acquired image are generated by using an acoustic wave-based adversarial example simulation model, wherein the simulated image examples have adversarial effects on a deep learning algorithm in a target machine vision system.

At S103, the generated simulated image examples are optimized by using an adversarial example optimization method to obtain optimal adversarial examples and corresponding adversarial parameters.

S104, the adversarial parameters are injected into an inertial sensor of the target machine vision system in a manner of an acoustic wave by using an inertial sensor reading injection method, such that the adversarial parameters are used as sensor readings that will cause an image stabilization module in the target machine vision system to operate to generate particular blurry patterns in a generated real-world image so as to generate image adversarial examples in a physical world.

With the steps of the method for generating image adversarial examples based on an acoustic wave according to an embodiment of the present application, an optimal adversarial parameter for a target object can be injected into the inertial sensor of the target machine vision system by means of an acoustic wave and is used as sensor readings, which will cause an image stabilization module in the target machine vision system to operate to generate particular blurry patterns in an captured real-world image, and in turn to generate an image adversarial example in a physical world.

FIG. 2 is a more detailed schematic diagram illustrating a method for generating image adversarial examples based on an acoustic wave according to an embodiment of the present application.

As shown in FIG. 2, in some embodiments, the acoustic wave-based adversarial example simulation model is constructed by the following steps:

(1) false camera motion modeling: An existing machine vision system uses a camera to shoot a target object or scene, and then uses a deep learning algorithm to process an image to achieve perception of surrounding environment or target detection. In order to improve accuracy of the perception and detection, the existing machine vision system uses image stabilization to make compensation, thereby reducing image blurs caused by a camera shake. The image stabilization usually uses an inertial sensor such as an accelerometer and a gyroscope to estimate motion of the camera and an acoustic attack may cause the inertial sensor to have a change in its readings, an acoustic attack for a stable camera may cause the image stabilization to perform an incorrect compensation, which in turn results a blurred image. It is assumed that false readings of the inertial sensor caused by an acoustic attack is $M_f = \{a_x, a_y, a_z, \omega_r, \omega_p, \omega_y\}$, where $a_x$, $a_y$, $a_z$ are false acceleration readings at x, y, z axes of an accelerometer, respectively, $\omega_r$, $\omega_p$, $\omega_y$ are false angular velocity readings at roll, pitch, yaw axes of a gyroscope, respectively, and it is assumed that the image stabilization module is operable to perform a complete compensation, and false camera motion caused by the acoustic attack is $M_c = \{-a_x, -a_y, -a_z, -\omega_r, -\omega_p, -\omega_y\}$. In the present invention, the acoustic wave-based adversarial example simulation model is constructed by four dimensions including three dimensions of x, y, z axes of the accelerometer and one dimension of roll axis of the gyroscope among the six dimensions.

(2) pixel motion modeling. The false camera motion may cause a different imaging position of the target object or the target scene, resulting in occurrence of pixel motion in an output image.

with respect to the dimension of x axis of the accelerometer, for any pixel in the image, the false camera motion $-a_x$ causes a pixel displacement of $$\frac{f}{2u} a_x T^2$$

in an opposite direction during an imaging process, where f is a focal length of the camera and u is an object distance of the target object or the target scene, T is a exposure time of the camera;

with respect to the dimension of y axis of the accelerometer, for any pixel in the image, the false camera motion $-a_y$ causes a pixel displacement of $$\frac{f}{2u} a_y T^2$$

in an opposite direction during the imaging process;

with respect to the dimension of z axis of the accelerometer, for any pixel in the image, the false camera motion $-a_z$ causes a pixel displacement of $$\frac{r_o}{2u} a_Z T^2$$

in a direction far away from a center of the image during the imaging process, where $r_o$ is a distance between the pixel and the center of the image;

with respect to the dimension of roll axis of the gyroscope, for any pixel in the image, the false camera motion $-\omega_r$ causes pixel displacement of $\omega_r T r_c$ in an opposite direction during the imaging process, where $r_c$ is a distance between the pixel and a center of angular velocity rotation;

(3) image blur modeling: pixel motion during the imaging process will cause image blur, wherein false camera motion in dimensions of x axis and y axis of the accelerometer causes linear pixel motion, resulting in linear image blur; false camera in the dimension of z axis of the accelerometer causes radial pixel motion, resulting in radial image blur; and false camera motion in the dimension of roll axis of the gyroscope causes rotary pixel motion, resulting in rotary image blur; wherein a unified image blur model is constructed for the above blurs as follows:

$$B(i, j) = \frac{1}{n+1} \sum_{k=-n}^{0} X(i'(k), j'(k))$$

$$[i'(k), j'(k)]^T = [u(k), v(k)]^T + [i, j]^T$$

$$[u(k), v(k)]^T = \begin{bmatrix} \cos\alpha & \cos\left(\frac{k}{n}\beta + \gamma\right) & \cos\delta \\ \sin\alpha & \sin\left(\frac{k}{n}\beta + \gamma\right) & \sin\delta \end{bmatrix} \begin{bmatrix} \frac{kf|a_x + a_y|T^2}{2nu} \\ \frac{kfa_z T^2 r_o}{2nu} \end{bmatrix}$$

$$\alpha = \arccos\left(\frac{a_x \cdot a_y}{|a_x||a_y|}\right)$$

$$\beta = \omega_\gamma T$$

$$\gamma = \arctan\left(\frac{j - c_1}{i - c_0}\right)$$

-continued $$\delta = \arctan\left(\frac{j - O_1}{i - O_0}\right)$$

$$r_c = \|(i,\ j),\ (c_0,\ c_1)\|_2$$

$$r_o = \|(i,\ j),\ (o_0,\ o_1)\|_2$$

where X is an original image, B is a blurred image, (i,j) is an coordinate of a pixel, B(i,j) is a pixel with an coordinates (i,j) in the blurred image, n is the number of discrete points, $(c_0,\ c_1)$ is a coordinate of an image center, $(o_0,\ o_1)$ is a coordinate of a rotation center. The simulated image examples are obtained under respective adversarial parameters based on the false camera motion modeling, the pixel motion modeling, and the image blur modeling.

As shown in FIG. 2, in some embodiments, adversarial example optimization method mainly includes the following steps:

(1) designing optimized functions: different optimized functions are designed for different types of adversarial image examples; wherein three types of adversarial image examples with different effects are taken into consideration: the first type is an adversarial image example with a hiding effect, which makes the depth learning algorithm unable to identify the target object; the second type is an adversarial image example with a creating effect, which creates a target object in the current image that is detectable by the deep learning algorithm; and the third type is an adversarial image example with a changing effect, which enables the deep learning algorithm to detect the target object as another object;

for the adversarial image example with a hiding effect, optimization functions are:

$$\min_{a_x,a_y,a_z,\omega_r} -w_1 S_p^B S_p^C + w_2 \|B - X\|_p$$

$$\text{s.t. } |a_x + a_y + a_z| < \varepsilon_1$$

$$|\omega_r| < \varepsilon_2$$

where p is a number of the target object, $$S_p^B$$

is a detection confidence of an area of the target object outputted by the deep learning algorithm, $$S_p^C$$

is a detection confidence of a category of the target object outputted by the deep learning algorithm, $w_1$ and $w_2$ are weight values for balancing effectiveness of the adversarial image examples and example generation cost, $\varepsilon_1$ and $\varepsilon_2$ are upper limits of influences of acoustic waves on readings of the accelerometer and the gyroscope respectively;

for the adversarial image example with a creating effect, optimization functions are:

$$\min_{a_x,a_y,a_z,\omega_r} -w_3 \frac{S_o^B S_o^C \mid C_o = T}{\sum_{p=1}^m Uop} + w_4 \|B - X\|_p$$

-continued $$\text{s.t. } |a_x + a_y + a_z| < \varepsilon_1$$

$$|\omega_r| < \varepsilon_2$$

where o is the number of a target object to be created, $C_o = T$ is a category of the target object to be created, $$S_o^B$$

is a detection confidence of an area of the target object to be created outputted by the deep learning algorithm, $$S_o^C$$

is a detection confidence of a category of the target object to be created outputted by the deep learning algorithm, p is a number of an existed object in the image, m is the number of the existed objects in the image, Uop is an intersection ratio between the area of the object o to be created and the area of the existed object p, $w_3$ and $w_4$ are weight values for balancing effectiveness of the adversarial image examples and example generation cost, $\varepsilon_1$ and $\varepsilon_2$ are upper limits of influences of acoustic waves on readings of the accelerometer and the gyroscope respectively;

for the adversarial image example with a changing effect, optimization functions are:

$$\min_{a_x,a_y,a_z,\omega_r} -w_5 Upp' S_p^{B'} S_p^{C'} \mid C_p' = T + w_6 \|B - X\|_p$$

$$\text{s.t. } |a_x + a_y + a_z| < \varepsilon_1$$

$$|\omega_r| < \varepsilon_2$$

where p is a number of the target object, $$S_p^{B'}$$

is a detection confidence of a modified area of the target object outputted by the deep learning algorithm, $$S_p^{C''}$$

is a detection confidence of a modified category of the target object outputted by the deep learning algorithm, $C_p' = T$ is the modified category of the target object, Upp' is an intersection ratio of the area of the target object p before modification and the area of the target object p' after modification, $w_5$ and $w_6$ are weight values for balancing effectiveness of the adversarial image examples and example generation cost, $\varepsilon_1$ and $\varepsilon_2$ are upper limits of influences of acoustic waves on readings of the accelerometer and the gyroscope respectively;

(2) solving optimized functions: the optimized functions are solved by using a Bayesian optimization method to obtain the optimal adversarial parameters.

As shown in FIG. 2, in some embodiments, the inertial sensor reading injection method includes the following steps:

(1) determining a resonance frequency of the inertial sensor in the target machine vision system by a frequency scanning;

(2) adjusting a resonance frequency of the acoustic wave to introduce a direct current (DC) component into an analog-to-electrical converter so as to stabilize an output of the sensor; and (3) performing an amplitude modulation to shape a waveform outputted from the sensor such that the sensor readings approximate the adversarial parameters.

Figure 3:
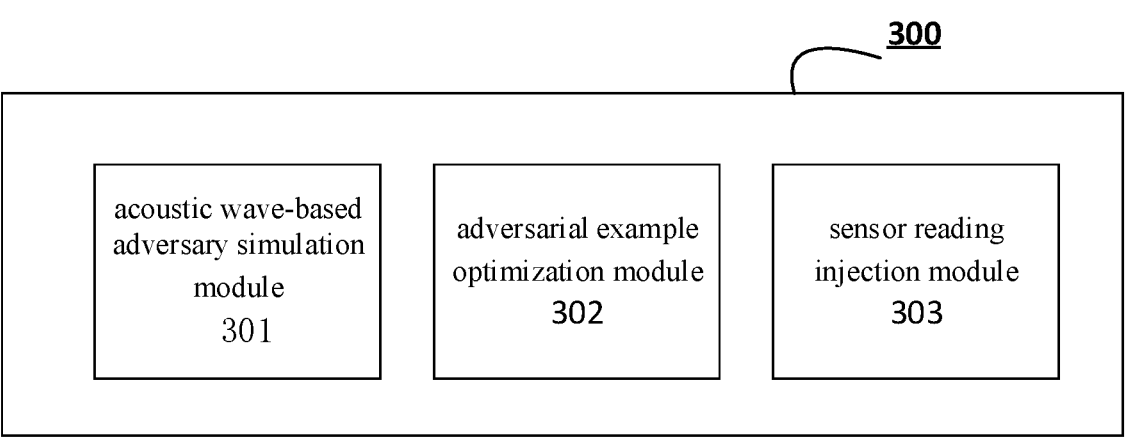
FIG. 3 is a block diagram illustrating a system for generating image adversarial examples based on an acoustic wave according to an embodiment of the present application.

The method for generating image adversarial examples based on an acoustic wave according to an embodiment of the present application has been described above. A system for generating image adversarial examples based on an acoustic wave according to an embodiment of the present application will be discussed below. FIG. 3 shows a system for generating image adversarial examples based on an acoustic wave according to an embodiment of the present application.

The system 300 for generating image adversarial examples based on an acoustic wave according to the embodiment of the present application includes: an acoustic wave-based adversary simulation module 301, an adversarial example optimization module 302, and a sensor reading injection module 303.

The acoustic wave-based adversary simulation module 301 is configured for false camera motion modeling, pixel motion modeling and image blur modeling.

The adversarial example optimization module 302 is configured for optimization of a function design and optimization of a function solution.

The sensor reading injection module 303 is configured for resonance frequency searching, false reading stabilization, and false reading shaping.

The system utilizes the acoustic wave-based adversary simulation module 301, the adversarial example optimization module 302 and the sensor reading injection module 303 to implement the method for generating image adversarial examples based on an acoustic wave as described above.

Figure 4:
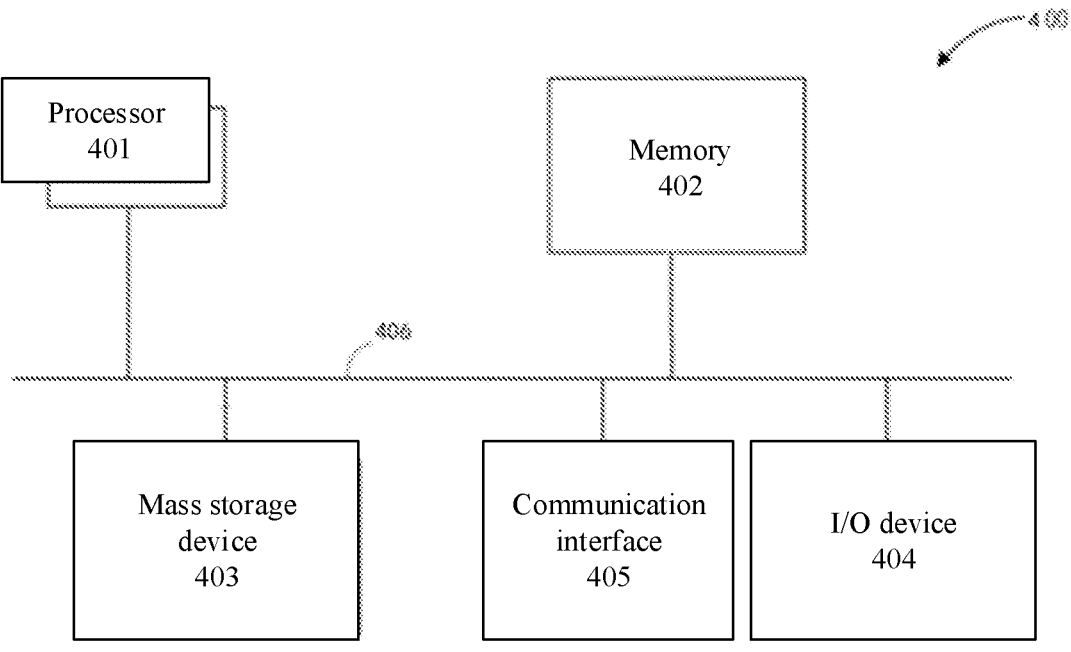
FIG. 4 is a block diagram illustrating a computing device according to an embodiment of the present application.

FIG. 4 is a block diagram illustrating a computing device 400 according to an embodiment of the present application. The above described method for generating image adversarial examples based on an acoustic wave can be implemented by the computing device 400.

As shown, the computing device 400 may include one or more processors or processor cores 401 and memory 402. In the present application, including the claims, the terms "processor" and "processor core" are synonymous unless the context clearly indicates other requirements. The processor 401 may include any type of processor, such as a central processing unit, microprocessor, and the like. The processor 401 may be implemented as an integrated circuit having multiple cores, e.g., a multi-core microprocessor. In an embodiment, the memory 402 may be a system memory. The computing device 400 may include a mass storage device 403 (e.g., magnetic disk, hard drive, volatile memory (e.g., dynamic random-access memory (DRAM), compact disc read-only memory (CD-ROM), digital versatile disk (DVD), etc.). In general, the memory 402 and/or mass storage device 403 may be any type of temporary and/or persistent storage, including, but not limited to, volatile and non-volatile memory, optical, magnetic, and/or solid-state mass storage, etc. The volatile memory may include, but is not limited to, a static and/or dynamic random access memory. The non-volatile memory may include, but is not limited to, an electrically erasable programmable read-only memory, a phase change memory, a resistive memory, and the like.

The computing device 400 may also include an input/output (I/O) device 404 (e.g., a display such as a touch screen display), keyboard, cursor control, remote control, game controller, image capture device, etc.) and a communication interfaces 405 (e.g. a network interface card, modem, infrared receiver, radio receiver (e.g., Bluetooth), etc.). The communication interface 405 may include a communication chip, which may be configured for wired or wireless communication with other devices.

The elements of the computing device 400 described above may be coupled to each other via a system bus 406, which represents one or more buses. In the case of multiple buses, they may be bridged by one or more bus bridges (not shown). Each of these elements may perform its conventional functions known in the art. Specifically, the memory 402 and the mass storage device 403 may be employed to store a work and permanent copy of programming instructions for operation of device 400. Various elements may be implemented by assembly instructions supported by the processor(s) 401 or a high-level language that may be compiled into such instructions.

A permanent copy of the programming instructions may be placed into the mass storage device 403 at factory or distributed in the field via, for example, a distribution medium (not shown) such as a compact disc (CD), or via the communication interface 405. That is, one or more distribution media having an implementation of agent programs may be employed to distribute the agent and program various computing devices.

In various implementations, the computing device 400 may include one or more of a laptop, netbook, notebook, ultrabook, smartphone, tablet, personal digital assistant (PDA), ultramobile PC, mobile phone or digital camera. In further implementations, the computing device 400 may be any other electronic device that processes data. Various embodiments may include any suitable combination of the above-described embodiments, including alternative embodiments of the embodiments described above (e.g., the term "and" may be interpreted as "and/or"). Furthermore, some embodiments may include one or more articles (e.g., non-transitory computer-readable media) having stored thereon instructions that, when executed, cause operations of any of the above-described embodiments. Additionally, some embodiments may include a device or system including any suitable means for performing various operations of the above-described embodiments.

The above description of illustrated implementations, including those described in the Abstract, is not intended to be exhaustive or to limit embodiments of the disclosure to the precise forms disclosed. While specific implementations and examples are described herein for illustrative purposes, various equivalent modifications are possible within the scope of the present disclosure, as recognized by a person skilled in the art.

These modifications can be made to embodiments of the present disclosure in light of the foregoing detailed descriptions. The terms used in the appended claims should not be construed to limit the various embodiments of the present disclosure to the specific implementations disclosed in the specification and claims. Rather, the scope is to be determined solely by the appended claims, which are to be construed in accordance with established claim interpretation guidelines.

What is claimed is:

1. A method for generating image adversarial examples based on an acoustic wave, comprising:

acquiring an image containing a target object or a target scene;

generating simulated image examples for the acquired image by using an acoustic wave-based adversarial example simulation model, wherein the simulated image examples have adversarial effects on a deep learning algorithm in a target machine vision system;

optimizing the generated simulated image examples by using an adversarial example optimization method to obtain optimal adversarial examples and corresponding adversarial parameters; and injecting the adversarial parameters into an inertial sensor of the target machine vision system in a manner of an acoustic wave by using an inertial sensor reading injection method, such that the adversarial parameters are used as sensor readings that will cause an image stabilization module in the target machine vision system to operate to generate particular blurry patterns in a generated real-world image so as to generate image adversarial examples in a physical world.

2. The method for generating image adversarial examples based on an acoustic wave according to claim 1, wherein the generating simulated image examples for the acquired image by using an acoustic wave-based adversarial example simulation model comprises constructing the acoustic wave-based adversarial example simulation model through:

(1) false camera motion modeling: it is assumed that false readings of the inertial sensor caused by an acoustic attack is $M_f = \{a_x, a_y, a_z, \omega_r, \omega_p, \omega_y\}$, where $a_x, a_y, a_z$ are false acceleration readings at x, y, z axes of an accelerometer, respectively, $\omega_r, \omega_p, \omega_y$ are false angular velocity readings at roll, pitch, yaw axes of a gyroscope, respectively and it is assumed that the image stabilization module is operable to perform a complete compensation, and false camera motion caused by the acoustic attack is $M_c = \{-a_x, -a_y, -a_z, -\omega_r, -\omega_p, -\omega_y\}$, wherein the acoustic wave-based adversarial example simulation model is constructed by four dimensions including three dimensions of x, y, z axes of the accelerometer and one dimension of roll axis of the gyroscope among the six dimensions;

(2) pixel motion modeling: the false camera motion will cause a different imaging position of the target object or the target scene, resulting in occurrence of pixel motion in an output image; wherein:

with respect to the dimension of x axis of the accelerometer, for any pixel in the image, the false camera motion $-a_x$ causes a pixel displacement of $$\frac{f}{2u}a_x T^2$$

in an opposite direction during an imaging process, where f is a focal length of the camera and u is an object distance of the target object or the target scene, T is a exposure time of the camera;

with respect to the dimension of y axis of the accelerometer, for any pixel in the image, the false camera motion $-a_y$ causes a pixel displacement of $$\frac{f}{2u}a_y T^2$$

in an opposite direction during the imaging process;

with respect to the dimension of z axis of the accelerometer, for any pixel in the image, the false camera motion $-a_z$ causes a pixel displacement of $$\frac{r_o}{2u}a_z T^2$$

in a direction far away from a center of the image during the imaging process, where $r_o$ is a distance between the pixel and the center of the image;

with respect to the dimension of roll axis of the gyroscope, for any pixel in the image, the false camera motion $-\omega_r$ causes pixel displacement of $\omega_r T r_c$ in an opposite direction during the imaging process, where $r_c$ is a distance between the pixel and a center of angular velocity rotation;

(3) image blur modeling: pixel motion during the imaging process will cause image blur, wherein false camera motion in dimensions of x axis and y axis of the accelerometer causes linear pixel motion, resulting in linear image blur; false camera in the dimension of z axis of the accelerometer causes radial pixel motion, resulting in radial image blur; and false camera motion in the dimension of roll axis of the gyroscope causes rotary pixel motion, resulting in rotary image blur; wherein a unified image blur model is constructed for the above blurs as follows:

$$B(i, j) = \frac{1}{n+1}\sum_{k=-n}^{0} X(i'(k), j'(k))$$

$$[i'(k), j'(k)]^T = [u(k), v(k)]^T + [i, j]^T$$

$$[u(k), v(k)]^T = \begin{bmatrix} \cos\alpha & \cos\left(\frac{k}{n}\beta+\gamma\right) & \cos\delta \\ \sin\alpha & \sin\left(\frac{k}{n}\beta+\gamma\right) & \sin\delta \end{bmatrix} \begin{bmatrix} \dfrac{kf|a_x+a_y|T}{2nu} \\ r_c \\ \dfrac{kf a_z T^2 r_o}{\partial nu} \end{bmatrix}$$

$$\alpha = \arccos\left(\frac{a_x \cdot a_y}{|a_x||a_y|}\right)$$

$$\beta = \omega_r T$$

$$\gamma = \arctan\left(\frac{j-c_1}{i-c_0}\right)$$

$$\delta = \arctan\left(\frac{j-o_1}{i-o_0}\right)$$

$$r_c = \|(i, j), (c_0, c_1)\|_2$$

$$r_o = \|(i, j), (o_0, o_1)\|_2$$

where X is an original image, B is a blurred image, (i,j) is an coordinate of a pixel, B (i,j) is a pixel with an coordinates (i,j) in the blurred image, n is the number of discrete points, $(c_0, c_1)$ is a coordinate of an image center, $(o_0, o_1)$ is a coordinate of a rotation center; and the simulated image examples are obtained under respective adversarial parameters based on the false camera motion modeling, the pixel motion modeling, and the image blur modeling.

3. The method for generating image adversarial examples based on an acoustic wave according to claim 2, wherein the optimizing the generated simulated image examples by using an adversarial example optimization method comprises:

(1) designing optimized functions: different optimized functions are designed for different types of adversarial image examples; wherein three types of adversarial image examples with different effects are taken into consideration: the first type is an adversarial image example with a hiding effect, which makes the depth learning algorithm unable to identify the target object; the second type is an adversarial image example with a creating effect, which creates a target object in the current image that is detectable by the deep learning algorithm; and the third type is an adversarial image example with a changing effect, which enables the deep learning algorithm to detect the target object as another object;

for the adversarial image example with a hiding effect, optimization functions are:

$$\min_{a_x,a_y,a_z,\omega_r} w_1 S_p^B S_p^C + w_2 \|B - X\|_p$$

$$\text{s.t.} \quad |a_x + a_y + a_z| < \varepsilon_1$$

$$|\omega_r| < \varepsilon_2$$

where p is a number of the target object, $$S_p^B$$

is a detection confidence of an area of the target object outputted by the deep learning algorithm, $$S_p^C$$

is a detection confidence of a category of the target object outputted by the deep learning algorithm, $w_1$ and $w_2$ are weight values for balancing effectiveness of the adversarial image examples and example generation cost, $\varepsilon_1$ and $\varepsilon_2$ are upper limits of influences of acoustic waves on readings of the accelerometer and the gyroscope respectively;

for the adversarial image example with a creating effect, optimization functions are:

$$\min_{a_x,a_y,a_z,\omega_r} -w_3 \frac{S_o^B S_o^C \mid C_o = T}{\sum_{p=1}^{m} Uop} + w_4 \|B - X\|_p$$

$$\text{s.t.} \quad |a_x + a_y + a_z| < \varepsilon_1$$

$$|\omega_r| < \varepsilon_2$$

where o is the number of a target object to be created, $C_o=T$ is a category of the target object to be created, $$S_o^B$$

is a detection confidence of an area of the target object to be created outputted by the deep learning algorithm, $$S_o^C$$

is a detection confidence of a category of the target object to be created outputted by the deep learning algorithm, p is a number of an existed object in the image, m is the number of the existed objects in the image, Uop is an intersection ratio between the area of the object o to be created and the area of the existed object p, $w_3$ and $w_4$ are weight values for balancing effectiveness of the adversarial image examples and example generation cost, $\varepsilon_1$ and $\varepsilon_2$ are upper limits of influences of acoustic waves on readings of the accelerometer and the gyroscope respectively;

for the adversarial image example with a changing effect, optimization functions are:

$$\min_{a_x,a_y,a_z,\omega_r} -w_5 Upp' S_p^{B'} S_p^{C'} \mid C_p' = T + w_6 \|B - X\|_p$$

$$\text{s.t.} \quad |a_x + a_y + a_z| < \varepsilon_1$$

$$|\omega_r| < \varepsilon_2$$

where p is a number of the target object, $$S_p^{B'}$$

is a detection confidence of a modified area of the target object outputted by the deep learning algorithm, $$S_p^{C''}$$

is a detection confidence of a modified category of the target object outputted by the deep learning algorithm, $C_p'=T$ is the modified category of the target object, Upp' is an intersection ratio of the area of the target object p before modification and the area of the target object p' after modification, $w_5$ and $w_6$ are weight values for balancing effectiveness of the adversarial image examples and example generation cost, $\varepsilon_1$ and $\varepsilon_2$ are upper limits of influences of acoustic waves on readings of the accelerometer and the gyroscope respectively;

(2) solving optimized functions: the optimized functions are solved by using a Bayesian optimization method to obtain the optimal adversarial parameters.

4. The method for generating image adversarial examples based on an acoustic wave according to claim 1, wherein the inertial sensor reading injection method comprises:

determining a resonance frequency of the inertial sensor in the target machine vision system by a frequency scanning;

adjusting a resonance frequency of the acoustic wave to introduce a direct current (DC) component into an analog-to-electrical converter so as to stabilize an output of the sensor; and performing an amplitude modulation to shape a waveform outputted from the sensor such that the sensor readings approximate the adversarial parameters.

5. A system for generating image adversarial examples based on an acoustic wave, comprising: an acoustic wave-based adversary simulation module, an adversarial example optimization module, and a sensor reading injection module;

wherein the acoustic wave-based adversary simulation module is configured for false camera motion modeling, pixel motion modeling and image blur modeling;

the adversarial example optimization module is configured for design of optimized functions and solution of optimizes functions; and the sensor reading injection module is configured for resonance frequency determination, false reading stabilization, and false reading shaping;

the system utilizes the acoustic wave-based adversary simulation module, the adversarial example optimization module and the sensor reading injection module to implement the method for generating image adversarial examples based on an acoustic wave according to claim 1.

6. A system for generating image adversarial examples based on an acoustic wave, comprising:

a memory for storing instructions; and a processor that executes the instructions stored in the memory to perform the method for generating image adversarial examples based on an acoustic wave according to claim 1.

7. A non-transitory computer-readable storage medium storing instructions that, when executed by a processor, cause the processor to perform the method for generating image adversarial examples based on an acoustic wave according to claim 1.

8. A system for generating image adversarial examples based on an acoustic wave, comprising:

means for acquiring an image containing a target object or a target scene;

means for generating simulated image examples for the acquired image by using an acoustic wave-based adversarial example simulation model, wherein the simulated image examples have adversarial effects on a deep learning algorithm in a target machine vision system;

means for optimizing the generated simulated image examples by using an adversarial example optimization method to obtain optimal adversarial examples and corresponding adversarial parameters; and means for injecting the adversarial parameters into an inertial sensor of the target machine vision system in a manner of an acoustic wave by using an inertial sensor reading injection method, such that the adversarial parameters are used as sensor readings that will cause an image stabilization module in the target machine vision system to operate to generate particular blurry patterns in a generated real-world image so as to generate an image adversarial example in a physical world.

* * * * *